US010823186B2

(12) United States Patent
Lundsted Poulsen et al.

(10) Patent No.: US 10,823,186 B2
(45) Date of Patent: Nov. 3, 2020

(54) PUMP BEARING RETAINER

(71) Applicant: GRUNDFOS HOLDING A/S, Bjerringbro (DK)

(72) Inventors: Brian Lundsted Poulsen, Langå (DK); Anders Bøge Jensen, Aarhus (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 159 days.

(21) Appl. No.: 16/027,509

(22) Filed: Jul. 5, 2018

(65) Prior Publication Data
US 2019/0010950 A1 Jan. 10, 2019

(30) Foreign Application Priority Data

Jul. 6, 2017 (EP) .................................... 17179946

(51) Int. Cl.
| F04D 29/046 | (2006.01) |
| F16J 15/00 | (2006.01) |
| F04D 29/62 | (2006.01) |
| F04D 29/047 | (2006.01) |
| F16C 33/76 | (2006.01) |
| F04D 29/12 | (2006.01) |
| F04D 1/00 | (2006.01) |
| F16C 35/02 | (2006.01) |

(52) U.S. Cl.
CPC .......... *F04D 29/0465* (2013.01); *F04D 1/00* (2013.01); *F04D 29/047* (2013.01); *F04D 29/126* (2013.01); *F04D 29/628* (2013.01); *F16C 33/76* (2013.01); *F16C 35/02* (2013.01); *F16J 15/004* (2013.01); *F16C 2360/44* (2013.01); *F16C 2361/63* (2013.01); *F16C 2361/65* (2013.01)

(58) Field of Classification Search
CPC ............. F04D 29/0465; F04D 29/0462; F04D 29/046; F04D 29/0476; F04D 29/043
USPC .......................................................... 415/229
See application file for complete search history.

(56) References Cited

U.S. PATENT DOCUMENTS

| 4,240,677 A | 12/1980 | Payne et al. |
| 5,385,413 A | 1/1995 | Murphy et al. |
| 2005/0135718 A1 | 6/2005 | Vezina |
| 2013/0121808 A1 | 5/2013 | Ahrens et al. |

FOREIGN PATENT DOCUMENTS

| DE | 10 2013 004 339 A1 | 9/2014 |
| EP | 0 874 441 A2 | 10/1998 |
| EP | 0 874 441 A3 | 12/1999 |

(Continued)

*Primary Examiner* — Moshe Wilensky
*Assistant Examiner* — Jason Mikus
(74) *Attorney, Agent, or Firm* — McGlew and Tuttle, P.C.

(57) ABSTRACT

A pump bearing retainer (1), for a wet-running pump, includes a radially inner section (3) including an inner section surface (9) for a press-fit contact with an essentially cylinder-shaped radial outer surface (29) of a pump bearing (13). A radially outer section (7) includes an annular or essentially conical-shaped outer section surface (17) with a cone angle ($\theta_1$) equal to or larger than 45°. An intermediate section (5) extends from the inner section (3) to the outer section (7). The intermediate section (5) includes an essentially conical-shaped intermediate section surface (15) with a cone angle ($\theta_2$) smaller than 45°. A longitudinal cross-section area (A) of the inner section (3) is smaller than a longitudinal cross-section area (B) of the intermediate section (5).

20 Claims, 3 Drawing Sheets

(56) References Cited

FOREIGN PATENT DOCUMENTS

| FR | 2 366 483 A1 | 4/1978 |
|---|---|---|
| JP | 2003 139151 A | 5/2003 |
| WO | 03/079518 A1 | 9/2003 |

PUMP BEARING RETAINER

CROSS REFERENCE TO RELATED APPLICATION

This application claims the benefit of priority under 35 U.S.C. § 119 of European Application 17179946.3, filed Jul. 6, 2017, the entire contents of which are incorporated herein by reference.

TECHNICAL FIELD

The present disclosure relates generally to pump bearing retainers, i.e. pump bearing retainers typically used in wet-running pumps, in particular in speed-controlled wet-running centrifugal pumps.

BACKGROUND

Wet-running centrifugal pumps usually comprise a rotor can separating a wet-running permanent magnet rotor from a dry stator. The rotor drives an impeller located in a pump housing. The rotor is usually mounted on a rotor axle which is rotatable within at least one radial bearing. The radial bearing is usually circumferentially retained and centered within the pump by a pump bearing retainer, sometimes referred to as bearing plate or disc. The pump bearing retainer has a central opening into which the bearing is press-fitted in axial direction during manufacture or assembly. In order to achieve a durable press-fit, the axial pressing forces are usually very high. Therefore, there is a high risk that a bearing breaks or spalls during the press-fit. In particular, ceramic surfaces of bearings may be damaged in this process.

SUMMARY

In contrast to known pump bearing retainers, embodiments of the present disclosure provide a pump bearing retainer significantly reducing the risk of damaging the bearing when it is press-fitted into the retainer while providing a durable press-fit between the bearing and the retainer. It is a further advantage of the pump bearing retainer according to the present disclosure that the production tolerance limits on both the bearing and the bearing retainer can be released.

In accordance with a first aspect of the present disclosure, a pump bearing retainer for a wet-running pump is provided comprising a radially inner section comprising an inner section surface for a press-fit contact with an essentially cylinder-shaped radial outer surface of a pump bearing, a radially outer section comprising an annular or essentially conical-shaped outer section surface with a cone angle larger than 45°, and an intermediate section extending from the inner section to the outer section, wherein the intermediate section comprises an essentially conical-shaped intermediate section surface with a cone angle smaller than 45°, wherein the longitudinal cross-section area A of the inner section is smaller than the longitudinal cross-section area B of the intermediate section.

Herein, an annular outer section surface shall be equivalent to an essentially conical-shaped outer section surface with a cone angle of 90°. The outer section surface may extend over the full outer section or it may extend only partially over the outer section. Analogously, the intermediate section surface may extend over the full intermediate section or it may extend only partially over the intermediate section. The cone angle may be constant or vary in radial direction within the outer section and/or within the intermediate section. In case the outer section surface and/or the intermediate section surface is curved, the relevant cone angle θ may be defined here as the average cone angle, i.e.

$$\theta = \int_{R_{in}}^{R_{out}} \frac{\partial \theta(r)}{\partial r} dr,$$

wherein θ(r) is the local cone angle defined as the cone angle of a virtual coaxial cone touching the surface tangentially at a radius r, $R_{in}$ is the inner radius of the respective section surface and $R_{out}$ is the outer radius of the respective section surface. In case the outer section surface and/or the intermediate section surface comprise N>1 steps or sections between undifferentiable points, where $$\frac{\partial \theta(r)}{\partial r}$$

is not defined, the relevant cone angle θ may be defined here as the average cone angle, $$i.e. = \sum_{i=1}^{N} \frac{\theta_i}{N},$$

wherein $\theta_i$ is the average cone angle of the $i^{th}$ step or section.

The smaller longitudinal cross-section area A of the inner section has the beneficial effect that it is less resistant to a radial widening when the bearing is press-fitted into the pump bearing retainer. Thereby, the risk of bearing breaks or spalls during the press-fit is significantly reduced. Furthermore, the radial production tolerance limits on both the bearing and the bearing retainer can be released.

During the press-fit, the inner section may at least be partially deformed in a plastic way, i.e. the inner section would not fully elastically snap back into its initial shape before the press-fit if the bearing were unmounted from the pump bearing retainer. Compared to the inner section, the intermediate section may at least be partially deformed in a more flexible way, i.e. the intermediate section would more elastically snap back closer to its initial shape if the bearing were unmounted from the pump bearing retainer. In other words, the intermediate section may have an elastic behavior with a smaller hysteresis than the inner section.

The axial press-in forces during the press-fit may be equivalent to several hundred kilograms or more. Thus, the longitudinal cross-section area A of the inner section is preferably large enough to provide a sufficiently tight press-fit and to prevent the inner section from tearing apart during the press-fit. Optionally, the inner section surface may be essentially cylinder-shaped for a press-fit contact with an essentially cylinder-shaped radial outer surface of a pump bearing. Thereby, the full inner section surface may provide the necessary frictional contact providing the sufficiently tight press-fit.

Optionally, the inner section surface may comprise at least one first portion and at least one second portion in a circumferential direction, wherein the at least one first portion has a first radius and the at least one second portion has a second radius being larger than the first radius, such that the at least first portion defines at least one contact portion for a press-fit with an essentially cylinder-shaped radial outer surface of a pump bearing, and such that the at least one second portion defines at least one axial fluid channel between the inner section and a pump bearing. This is advantageous to further reduce the resistance of the inner section to radial widening and to provide axial fluid channels.

Alternatively, or in addition, the inner section may comprise at least one first sub-section and at least one second sub-section in circumferential direction, wherein the at least one first sub-section has a first radial thickness and the at least one second sub-section has a second radial thickness being larger than the first radial thickness. This may also further reduce the resistance of the inner section, in particular at the first thinner sub-section to radial widening. The thickness may be constant or vary in the circumferential direction within the sub-sections and/or between them. The thickness shall be defined here as the average thickness within a sub-section.

Optionally, the radial thickness t of the intermediate section may be smaller at an end towards the inner section than at an end towards the outer section. This is beneficial to gradually or step-wisely increase the resistance to radial widening in radial outward direction from the inner section via the intermediate section to the outer section. The outer section, or at least a radially outer rim of the outer section, is preferably not widened at all during the press-fit.

Optionally, the axial length h of the inner section surface may be shorter than the axial length X of the intermediate section surface, wherein the ratio X/h is preferably in the range of 2 to 4. The longer axial length X of the intermediate section surface allows for a more flexible radial widening providing the necessary radial inward pressure to achieve a sufficiently tight press-fit of the bearing with the pump bearing retainer.

Optionally, the intermediate section may be more flexible in radial direction than the outer section, i.e. the inner diameter of the intermediate section widens more than the inner diameter of the outer section during the press-fit.

Optionally, the pump bearing retainer may further comprise a pump bearing press-fitted into the inner section. Once the pump bearing and its dimensions is known, the pump bearing retainer may be specifically optimized to retain such a pump bearing. For instance, the pump bearing may be a radial bearing with an inner sliding surface for a sliding contact with a rotor axle of a pump, wherein the pump bearing preferably comprises a ceramic surface. Optionally, the pump bearing retainer may be optimized for the pump bearing having a radial outer surface with an axial length H by designing the inner section surface with an axial length h smaller than half of the axial length H of the radial outer surface of the pump bearing, i.e. h<H/2, preferably h<H/3.

Alternatively, or in addition, an axial upper end of the inner section surface may have an axial distance p to an axial upper end of the radial outer surface of the pump bearing, wherein $0.2 \cdot (H-h) < p < 0.8 \cdot (H-h)$. Likewise, alternatively or in addition, an axial lower end of the inner section surface may have an axial distance q to an axial lower end of the radial outer surface of the pump bearing, wherein $0.2 \cdot (H-h) < q < 0.8 \cdot (H-h)$. Thereby, the inner section may be axially centered with respect to the bearing to prevent the pump bearing retainer from slipping off the bearing. Thus, the axial production tolerance limits on both the bearing and the bearing retainer can be released.

In accordance with a second aspect of the present disclosure, a pump is provided comprising a pump bearing retainer as described above, wherein the pump is a centrifugal pump for conveying water in a heating system. The market for such household pumps is large and competitive. Therefore, the production of such pumps is optimized to allow a high production rate while minimizing deficiencies due to breaks or spalls of ceramic bearings that must be scrapped. A centrifugal pump for conveying water in a heating system with a pump bearing retainer as described above can be produced at lower cost due to less breaks or spalls of expensive ceramic bearings.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION

Figure 1:
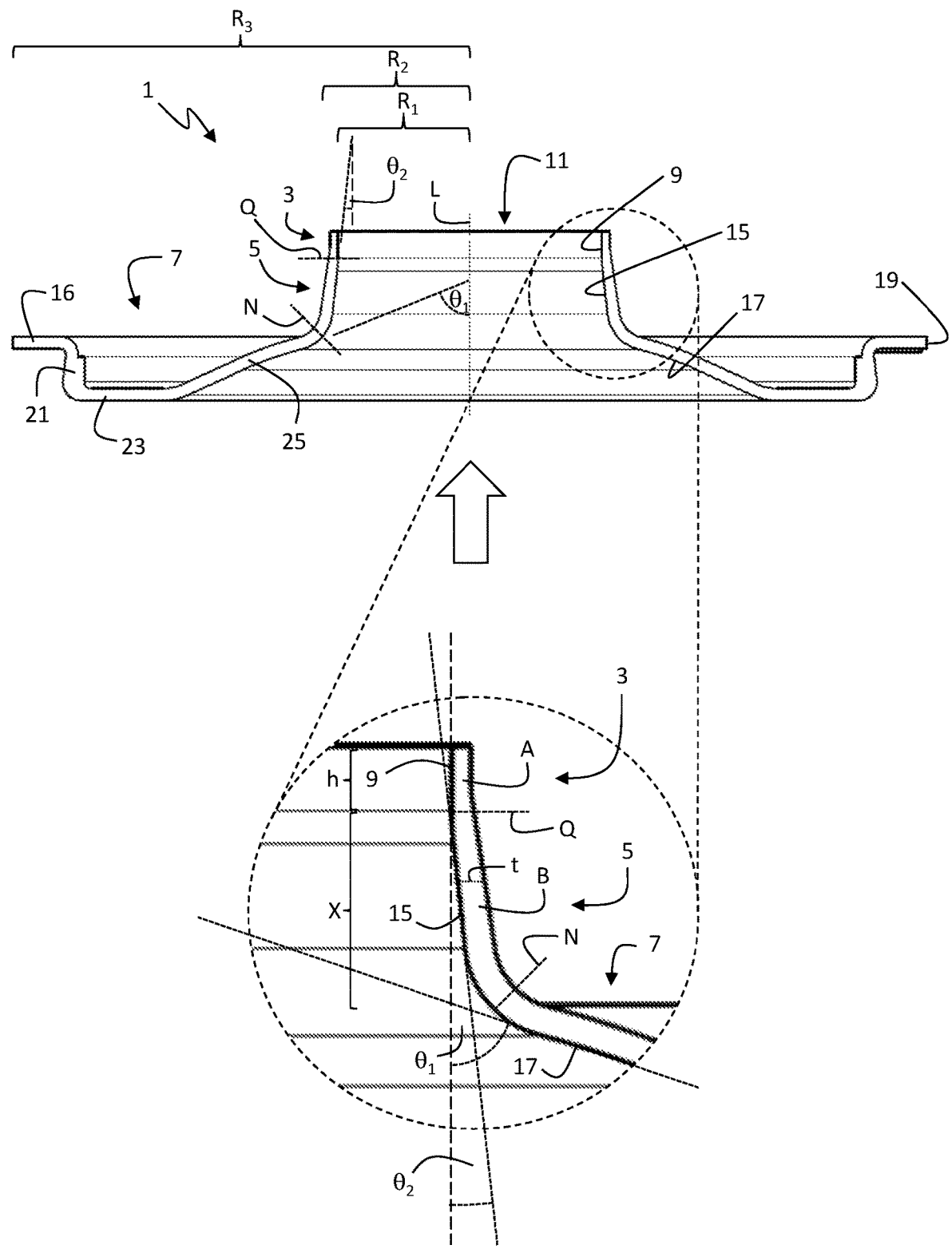
FIG. 1 is a cross-sectional view of an example of a pump bearing retainer according to a first embodiment of the present disclosure.
Figure 2:
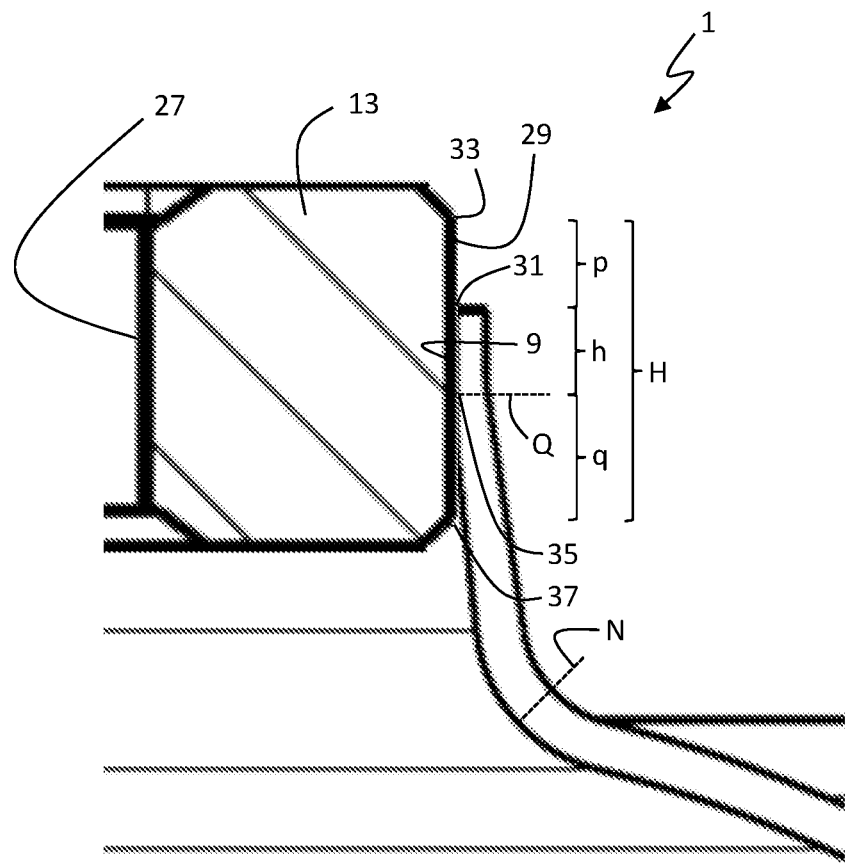
FIG. 2 is a more detailed partial cross-sectional view of an example of a pump bearing retainer with a press-fitted bearing according to a first embodiment of the present disclosure.

FIG. 1 shows a pump bearing retainer 1 comprising an inner section 3, an intermediate section 5 and an outer section 7. The pump bearing retainer 1 is in this first embodiment is integrally and homogenously made of a single material, preferably a sheet of metal, and rotationally symmetric with respect to a longitudinal axis L. The pump bearing retainer 1 may be forged, milled, cut, fettled, burred, molded, grinded, rolled, 3D-printed (additively manufactured) and/or pressed into the shown hat-like shape. A pump bearing 13 (see. FIG. 2) is to be press-fitted from below (see hollow arrow) into the pump bearing retainer 1. Thus, the relevant surfaces of the pump bearing retainer 1 are here the bottom and inner surfaces. It should be noted that the pump bearing retainer 1 may have any spatial orientation, so that terms like "below", "above", "under", "upper", "vertical", "horizontal" etc. are to be interpreted in a reference frame fixed to the pump bearing retainer 1.

The inner section 3 comprises an inner section surface 9 defining a central circular opening 11 with a radius $R_1$ into which a pump bearing can be press-fitted. The intermediate section 5 defines an essentially conical-shaped intermediate section surface 15 ranging from the radius $R_1$ to a radius $R_2$, where an outer section surface 17 of the outer section 5 starts. The outer section 7, ranging from the intermediate section surface 15 to an outer radius $R_3$, forms essentially a brim comprising four outer sub-sections, i.e. an annular first outer sub-section 16 defining a peripheral face 19 with the outer radius $R_3$ for centering the pump bearing retainer 1 within a pump housing (not shown), a cylinder-shaped second outer sub-section 21 stiffening the outer section 7, an annular third outer sub-section 23, and a conical-shaped fourth sub-section 25. The first outer sub-section 16, the second outer sub-section 21 and the annular third outer sub-section 23 are arranged in an essentially Z-shaped or S-shaped configuration to stiffen the outer section 7.

In the area of the conical-shaped fourth sub-section 25, the outer section surface 17 is essentially conical-shaped and has a cone angle $\theta_1$ above 45°. It should be noted that, alternatively, the fourth outer sub-section 25 could be annular, resulting in a cone angle $\theta_1$ of 90°. In order to increase the stiffness of the outer section 7, the fourth outer sub-section 25 is here slightly convexly curved, so that, strictly speaking, the cone angle $\theta_1$ of the outer section surface 17 is defined as $$\theta_1 = \int_{R_2}^{R_3} \frac{\partial \theta(r)}{\partial r} dr,$$

wherein $\theta(r)$ is the local cone angle defined as the cone angle of a virtual coaxial cone touching the surface tangentially at a radius r. In this case, the non-conical sub-sections, i.e. the annular first outer sub-section 16, the cylindrical second outer sub-section 21 and the annular third outer sub-section 23 may not contribute to the cone angle $\theta_1$ of the outer section surface 17.

The intermediate section 5 connects the outer section 7 with the inner section 3. The transition line between the outer section 7 and the intermediate section 5 may be defined by a virtual normal N on a virtual coaxial cone touching the surface tangentially and having cone angle of 45°. The transition line between the intermediate section 5 and the inner section 3 may be defined here by a virtual horizontal plane Q through the lowest point of the cylindrical inner section surface 9. The essentially conical-shaped intermediate section surface 15 ranging from the radius $R_1$ to a radius $R_2$ has a cone angle $\theta_2$ of less than 45°. As the local cone angle $\theta(r)$ varies slightly with radius r, the cone angle $\theta_2$ of the intermediate section surface 15 may be defined as $$\theta_2 = \int_{R_1}^{R_2} \frac{\partial \theta(r)}{\partial r} dr.$$

The magnified view in FIG. 1 a better view on the longitudinal cross-section area A of the inner section 3 and the longitudinal cross-section area B of the intermediate section 5. The inner section 3 has a significantly less longitudinal cross-section area than the intermediate section 5, i.e. A<B, preferably A<B/3. Thus, the inner section 3 is less resistant to a radial widening when a pump bearing is press-fitted into the pump bearing retainer 1. Thereby, the risk of breaks or spalls of a ceramic pump bearing during the press-fit is significantly reduced. During the press-fit, the inner section 3 may at least be partially widened in a plastic way, i.e. the inner section 3 would not fully elastically snap back into its initial shape if the pump bearing were unmounted from the pump bearing retainer 1. Compared to the inner section 3, the intermediate section 5 may at least be partially widened in a more flexible way, i.e. the intermediate section 5 would more elastically snap back closer to its initial shape if the pump bearing were unmounted from the pump bearing retainer 1. In other words, the intermediate section 5 may have an elastic behavior with a smaller hysteresis than the inner section 3.

The intermediate section 5 has thus a spring effect to keep a press-fitted pump bearing in place while the inner section 3 provides the minimum frictional surface, i.e. inner section surface 9, to keep the pump bearing in place. In order to improve the overall integrity, stability and flexibility, the radial thickness t of the intermediate section 5 is in this embodiment smaller at an end towards the inner section 3 than at an end towards the outer section 5. Furthermore, the axial length h of the inner section surface 9 is shorter than the axial length X of the intermediate section surface 15, wherein the ratio X/h is preferably in the range of 2 to 4. Due to the shape of the pump bearing retainer 1, the intermediate section 5 is also more flexible in radial direction than the outer section 7. The outer section 7 thus contributes to the required stiffness of the pump bearing retainer 1 and the intermediate section 5 contributes to the required flexibility of the pump bearing retainer 1 for permanently and reliably retaining the pump bearing 13 by press-fit. The inner section 3 contributes to the required plasticity of the pump bearing retainer 1 to avoid cracks, spalls and breaks of the pump bearing during press-fit. In other words, the inner section 3 is configured to deform at least partially plastically when a pump bearing is press-fitted into the inner section 3.

FIG. 2 shows the pump bearing retainer 1 with an annular-shaped pump bearing 13 press-fitted into the inner section 3. The pump bearing 13 is a radial bearing with a cylindrical inner sliding surface 27 for a sliding contact with a coaxial rotor axle of a pump. The pump bearing 13 comprises a ceramic surface. Preferably, the pump bearing 13 is fully made of ceramic material. Here, the inner and outer edges of the pump bearing 13 are chamfered to facilitate the insertion during press-fit and to avoid spalls at the edges.

The pump bearing comprises a radial outer surface 29 with an axial length H, wherein the inner section surface 9 has an axial length h smaller than half of the axial length H of the radial outer surface 29 of the pump bearing, i.e. h<H/2. Furthermore, an axial upper end 31 of the inner section surface 9 has an axial distance p to an axial upper end 33 of the radial outer surface 29 of the pump bearing 13, wherein $0.2 \cdot (H-h) < p < 0.8 \cdot (H-h)$. This makes sure that the pump bearing 13 is inserted deeply enough into the pump bearing retainer 1, but not too much. Analogously, an axial lower end 35 of the inner section surface 9 has an axial distance q to an axial lower end 37 of the radial outer surface 29 of the pump bearing 13, wherein $0.2 \cdot (H-h) < q < 0.8 \cdot (H-h)$.

Figure 3:
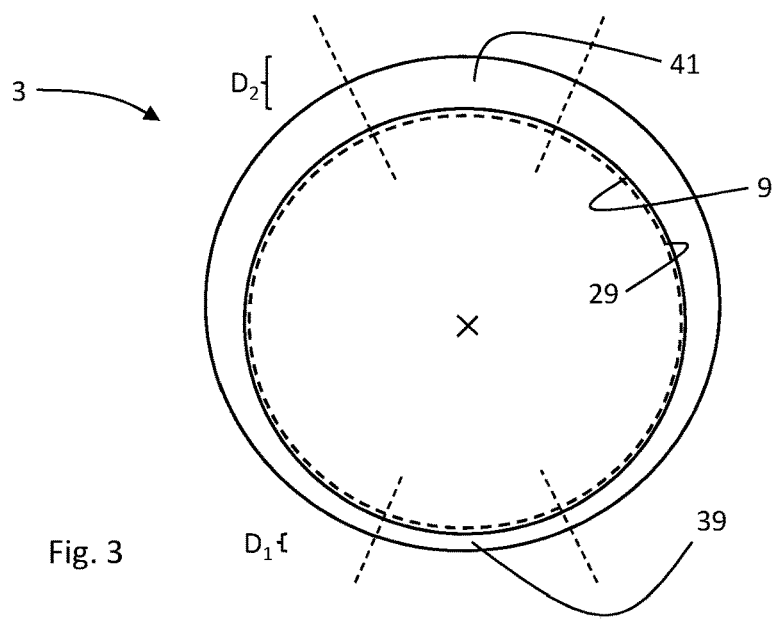
FIG. 3 is a top view of an inner section of an example of a pump bearing retainer according to a second embodiment of the present disclosure.

The top view of FIG. 3 on the inner section 3 shows an embodiment in which the inner section 3 comprises a first sub-section 39 and a second sub-section 41 in circumferential direction, wherein the first sub-section 39 has a first radial thickness $D_1$ and the second sub-section 41 has a second radial thickness $D_2$ being larger than the first radial thickness $D_1$. If the radial thickness varies in circumferential direction as shown, the sections may be arbitrarily defined as diametrically opposite sub-sections. The inner section 3 may at least partially plastically deform during the press-fit mostly in the area of the thinner first section 39.

Figure 4:
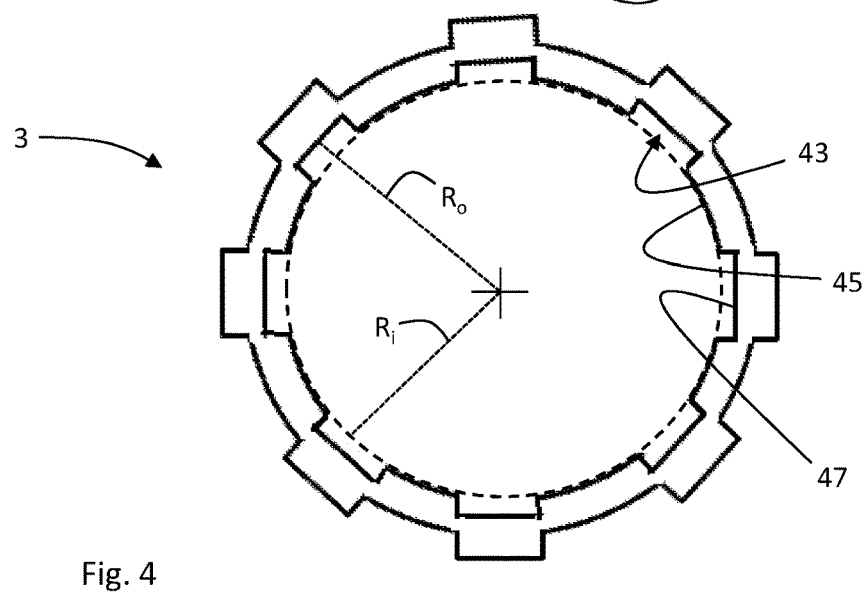
FIG. 4 is a top view of an inner section of an example of a pump bearing retainer according to a third embodiment of the present disclosure.

The embodiment of FIG. 4 shows the inner section 3 being "crenelated" in radial direction forming eight "crenels". The crenels 43 each form an axial fluid channel with essentially rectangular cross-section between the inner section 3 and a pump bearing 13. In other words, the inner section surface 9 comprises eight first portions 45 and eight second portions 47 in circumferential direction, wherein each first portion 45 has a first radius $R_i$, and each second portion 47 has a second radius $R_o$ being larger than the first radius $R_i$, such that the eight first portions 45 define eight contact portions for a press-fit with an essentially cylinder-shaped radial outer surface 29 of a pump bearing 13, and such that the eight second portions 47 define eight axial fluid channels between the inner section 3 and a pump bearing 13.

Figure 5:
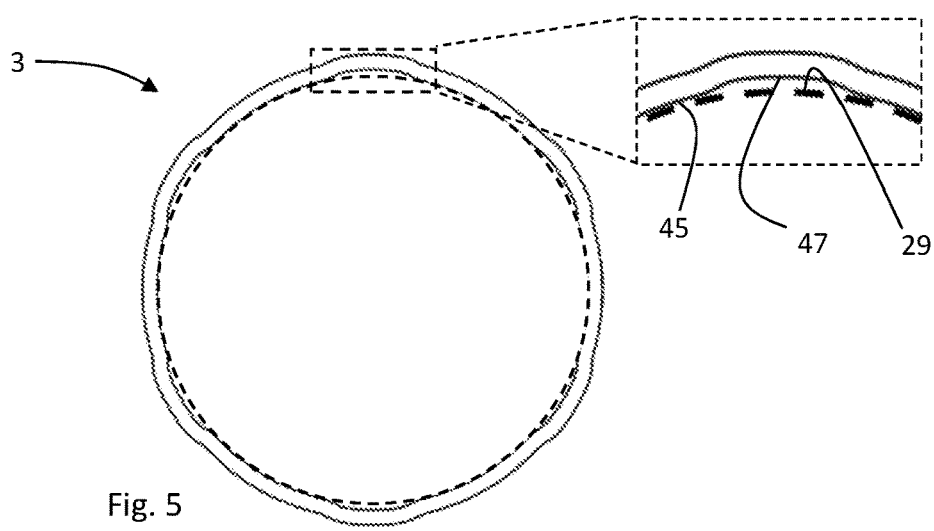
FIG. 5 is a top view of an inner section of an example of a pump bearing retainer according to a fourth embodiment of the present disclosure.

FIG. 5 shows a similar embodiment like FIG. 4, but only with six axial fluid channels. The second portions 47 in this case are concavely shaped radial protrusions with a smoothly curved transition between the first portions 45 and the second portions 47.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

What is claimed is:

1. A pump bearing retainer for a wet-running pump, the pump bearing retainer comprising:
    a radially inner section comprising an inner section surface for a press-fit contact with an essentially cylinder-shaped radial outer surface of a pump bearing;
    a radially outer section comprising an annular or essentially conical-shaped outer section surface with a cone angle equal to or larger than 45°; and
    an intermediate section extending from the inner section to the outer section, wherein the intermediate section comprises an essentially conical-shaped intermediate section surface with a cone angle smaller than 45°, wherein a longitudinal cross-section area of the inner section is smaller than a longitudinal cross-section area of the intermediate section, the inner section surface comprising at least one first portion and at least one second portion in a circumferential direction, the at least one first portion having a first radius and the at least one second portion having a second radius that is larger than the first radius, such that the at least first portion defines at least one contact portion for a press-fit with the essentially cylinder-shaped radial outer surface of the pump bearing, and such that the at least one second portion defines at least one axial fluid channel between the inner section and the pump bearing.

2. The pump bearing retainer according to claim 1, wherein the inner section surface is essentially cylinder-shaped.

3. The pump bearing retainer according to claim 1, wherein:
    the inner section comprises at least one first sub-section and at least one second sub-section in a circumferential direction;
    the at least one first sub-section has a first radial thickness and the at least one second sub-section has a second radial thickness that is larger than the first radial thickness.

4. The pump bearing retainer according to claim 1, wherein a radial thickness of the intermediate section is smaller at an end towards the inner section than at an end towards the outer section.

5. The pump bearing retainer according to claim 1, wherein:
    an inner section axial length of the inner section surface is shorter than an intermediate section axial length of the intermediate section surface; and
    a ratio of inner section axial length to intermediate section axial length is in a range of 2 to 4.

6. The pump bearing retainer according to claim 1, wherein the intermediate section is more flexible in a radial direction than the outer section.

7. The pump bearing retainer according to claim 1, wherein the inner section is configured to deform at least partially plastically when a pump bearing is press-fitted into the inner section.

8. The pump bearing retainer according to claim 1, further comprising a pump bearing press-fitted into the inner section.

9. The pump bearing retainer according to claim 8, wherein the pump bearing is a radial bearing with an inner sliding surface for a sliding contact with a rotor axle of a pump.

10. The pump bearing retainer according to claim 8, wherein the pump bearing comprises a ceramic surface.

11. The pump bearing retainer according to claim 8, wherein:
    the pump bearing comprises a radial outer surface with a radial outer surface axial length; and
    the inner section surface has an inner section surface axial length that is smaller than half radial outer surface axial length of the pump bearing.

12. The pump bearing retainer according to claim 8, wherein:
the pump bearing comprises a radial outer surface with a radial outer surface axial length (H);
the inner section surface has an inner section surface axial length (h);
an axial upper end of the inner section surface has an upper end axial distance (p) to an axial upper end of a radial outer surface of the pump bearing; and $0.2 \cdot (H-h) < p < 0.8 \cdot (H-h)$.

13. The pump bearing retainer according to claim 8, wherein
the pump bearing comprises a radial outer surface with a radial outer surface axial length (H);
the inner section surface has an inner section surface axial length (h);
an axial lower end of the inner section surface has a lower end axial distance (q) to an axial lower end of a radial outer surface of the pump bearing; and $0.2 \cdot (H-h) < q < 0.8 \cdot (H-h)$.

14. A pump comprising:
a pump bearing retainer comprising:
a radially inner section comprising an inner section surface for a press-fit contact with an essentially cylinder-shaped radial outer surface of a pump bearing;
a radially outer section comprising an annular or essentially conical-shaped outer section surface with a cone angle equal to or larger than 45°; and
an intermediate section extending from the inner section to the outer section, wherein the intermediate section comprises an essentially conical-shaped intermediate section surface with a cone angle smaller than 45°, wherein a longitudinal cross-section area of the inner section is smaller than a longitudinal cross-section area of the intermediate section, wherein the pump is a centrifugal pump for conveying water in a heating system, the inner section surface comprising at least one first portion and at least one second portion in a circumferential direction, the at least one first portion having a first radius and the at least one second portion having a second radius that is larger than the first radius, such that the at least first portion defines at least one contact portion for a press-fit with the essentially cylinder-shaped radial outer surface of the pump bearing, and such that the at least one second portion defines at least one axial fluid channel between the inner section and the pump bearing.

15. The pump according to any claim 14, wherein:
the inner section comprises at least one first sub-section and at least one second sub-section in a circumferential direction; and
the at least one first sub-section has a first radial thickness and the at least one second sub-section has a second radial thickness that is larger than the first radial thickness.

16. The pump according to claim 14, wherein:
an inner section axial length of the inner section surface is shorter than an intermediate section axial length of the intermediate section surface; and
a ratio of inner section axial length to intermediate section axial length is in a range of 2 to 4.

17. The pump according to claim 14, further comprising a pump bearing press-fitted into the inner section.

18. The pump according to claim 17, wherein the pump bearing is a radial bearing with an inner sliding surface for a sliding contact with a rotor axle of a pump.

19. A pump bearing retainer for a wet-running pump, the pump bearing retainer comprising:
a radially inner section comprising an inner section surface configured for a press-fit contact with an essentially cylinder-shaped radial outer surface of a pump bearing, the radially inner section comprising a radially inner section longitudinal cross-sectional area;
a radially outer section comprising an annular or essentially conical-shaped outer section surface with a cone angle equal to or larger than 45°; and
an intermediate section extending from the inner section to the outer section, wherein the intermediate section comprises an essentially conical-shaped intermediate section surface with a cone angle less than 45°, the intermediate section comprising an intermediate section cross-sectional area, the radially inner section longitudinal cross-sectional area being less than the intermediate section cross-sectional area, the inner section surface comprising a first inner section surface portion and a second inner section surface portion, each of the first inner section surface portion and the second inner section surface portion extending in a circumferential direction with respect to a longitudinal axis of the radially inner section, the first inner section surface portion being located at a first distance from the longitudinal axis, the second inner section surface portion being located at a second distance from the longitudinal axis, the second distance being greater than the first distance, the first inner section surface portion defining at least one contact portion, the at least one contact portion being configured to contact the essentially cylinder-shaped radial outer surface of the pump bearing to form a press-fit connection of the first inner section surface portion with the essentially cylinder-shaped radial outer surface of the pump bearing, wherein the second portion is configured to be located at a spaced location from the pump bearing.

20. The pump bearing retainer according to claim 1, wherein the second portion defines at least a portion of at least one axial fluid channel between the inner section and the pump bearing, the first inner section surface portion and the second inner section surface portion defining an opening of the inner section.

* * * * *